(12) United States Patent
Levien et al.

(10) Patent No.: US 7,111,280 B2
(45) Date of Patent: *Sep. 19, 2006

(54) SYSTEM AND METHOD FOR IMPLEMENTING A PROJECT FACILITY

(75) Inventors: Richard B. Levien, Berkeley, CA (US);
Cy H. Myers, Berkeley, CA (US);
Anthony A. Mowers, Berkeley, CA (US); Christopher J. Schille, Santa Clara, CA (US); Marc Shepard, Bellevue, WA (US)

(73) Assignee: Wind River Systems, Inc., Alameda, CA (US)

( * ) Notice: Subject to any disclaimer, the term of this patent is extended or adjusted under 35 U.S.C. 154(b) by 759 days.

This patent is subject to a terminal disclaimer.

(21) Appl. No.: 09/792,473

(22) Filed: Feb. 23, 2001

(65) Prior Publication Data

US 2001/0037494 A1    Nov. 1, 2001

Related U.S. Application Data

(60) Provisional application No. 60/184,856, filed on Feb. 25, 2000.

(51) Int. Cl.
*G06F 9/44* (2006.01)
*G06F 7/00* (2006.01)

(52) U.S. Cl. .................. 717/120; 717/100; 717/109; 717/124; 707/104.1

(58) Field of Classification Search ........ 717/100–113, 717/120–123, 168–178
See application file for complete search history.

(56) References Cited

U.S. PATENT DOCUMENTS 5,361,357 A    11/1994    Kionka

| | | | |
|---|---|---|---|
| 5,564,051 A | 10/1996 | Halliwell et al. | 707/200 |
| 5,764,992 A | 6/1998 | Kullick et al. | 717/170 |
| 5,909,581 A | 6/1999 | Park et al. | 717/170 |
| 5,953,532 A * | 9/1999 | Lochbaum | 717/176 |
| 6,006,034 A | 12/1999 | Heath et al. | 717/170 |
| 6,381,742 B1 * | 4/2002 | Forbes et al. | 717/176 |
| 6,442,754 B1 * | 8/2002 | Curtis | 717/175 |

FOREIGN PATENT DOCUMENTS

| | | |
|---|---|---|
| EP | 0 899 399 | 1/1999 |
| EP | 0 945 792 | 9/1999 |
| GB | 2 325 766 | 12/1998 |
| WO | 98 27487 | 6/1998 |
| WO | 99 23556 | 5/1999 |

* cited by examiner

*Primary Examiner*—Anthony Nguyen-Ba
(74) *Attorney, Agent, or Firm*—Fay Kaplun & Marcin, LLP

(57) ABSTRACT

A project analysis system and method is described to allow for automated generation of scalable bootable applications and downloadable applications, preferably in connection with an integrated development environment (IDE). The project analysis system and method includes facilities for automatically identifying and including software components in application development projects based on symbol dependencies and component dependencies. The project analysis system and method also includes facilities for automatically identifying and removing software components in application development projects where no symbol dependencies or component dependencies exist, thereby removing unused code. A graphical user interface is provided for user display and selection of includable and excludable components.

33 Claims, 16 Drawing Sheets

SYSTEM AND METHOD FOR IMPLEMENTING A PROJECT FACILITY

CROSS REFERENCE TO RELATED APPLICATIONS

This application claims the benefit of U.S. Provisional Application No. 60/184,856, filed Feb. 25, 2000.

BACKGROUND INFORMATION

Embedded devices such as automobiles, medical devices, and cellular phones have limited resources compared to standard "desktop" PC-type computing environments (for example, less memory may be used and a limited set of I/O devices may be supported). Because an embedded device has limited resources, it is easier to perform software development on an integrated development environment ("IDE") prior to implementation in the embedded device.

FIG. 1 shows a block diagram illustrating a typical IDE 1, such as the Tornado™ development environment from Wind River Systems, Inc., used to develop and debug software applications. The hardware used to implement the IDE 1 includes one or more hosts 10 and one or more targets 20 (e.g., embedded devices). The IDE 1 allows developers to organize, write, and compile applications on the host 100 and then download, run, and debug them on the target 20. The host 10 is typically equipped with large amounts of RAM and disk space, backup media, printers, and other peripherals. In contrast, the target 20 typically has limited resources (small amounts of RAM, no disk, no display, etc.), and perhaps some small amount of additional resources for testing and debugging. A number of alternatives exist for connecting the target 20 to the host 10, but usually the connection is either an Ethernet or serial link.

Referring to FIG. 1, the target 20 may include an application 137 which is software that performs a particular function (for example, providing the functionality required for a hand held computing device). The target 20 may also include an operating system 140 which may be used to control the allocation and usage of the target's resources. The operating system 140, such as VxWorks® from Wind River Systems, Inc., is typically "scalable", i.e., components of the operating system may be included or excluded depending on the requirements of the application 137. A component is an operating system facility that can be built into, or excluded from, a custom version of the operating system 140. For example, a network TCP/IP stack component can be used to connect to a network, but this component can be safely omitted from the operating system 140 if the application does not require network functionality. The scalable feature of the operating system is especially beneficial in embedded devices because these devices tend to vary widely, using different processors and other hardware. The operating system 140 can be tailored to satisfy the requirements of the particular hardware and functionality of the embedded device.

The target 20 may also include a target agent 143 which allows the target 20 to communicate with the host 10. The target agent 143 responds to requests transmitted by the host 10, for example, by returning results from such requests. These requests may include memory transactions, notification services for breakpoints and other target events, and other useful communication and debugging activities.

The host 10 includes a target server 128 used for communicating with the target 20. The target server 128 satisfies target requests by breaking each request into the necessary transactions with the target agent 143. The host 10 also includes tools 150 for, among other things, creating and debugging the application 137 that is downloaded to the target 20 and for configuring the operating system 140 with particular components. The tools 150 use the target server 128 to communicate with the target 20.

As stated earlier, the operating system 140 has numerous components that can be tuned, and included or excluded, depending on the requirements of the application 137. For example, various networking and file system components may be required for one application and not another, and the tools 150 provide a means for either including them in, or excluding them from the operating system 140. However, the tools 150 may be cumbersome in that the application has to be examined by a user of the IDE 1 in order to determine the components that the application needs, or does not need and thereafter, those needed components have to be manually added and the unneeded components have to be manually removed from the operating system 140.

The operating system 140 may implement objects that prevent interference by malfunctioning and/or malicious tasks (an object that performs an action) while maintaining high execution speeds and scalability. An example of such an object is a protection domain which is described in greater detail below. The tools 150 of the IDE 1 should support these objects.

The tools 150 on the host 10 have the following inadequacies:

(1) the tools 150 require manually finding the components which the application 137 needs and then manually adding those components to the operating system 140;

(2) the tools 150 do not provide information about components that are not required and thus can be safely removed from the operating system 140; and (3) the tools 150 should support new operating system objects.

SUMMARY

According to a first exemplary/preferred embodiment of the present invention, a method is described which includes the steps of reading an object module and identifying a number of imported symbols, identifying a needed component based on at least one of the number of imported symbols, and identifying the needed component as a required component when the needed component is not identified as present in a project data structure. Also according to the first exemplary/preferred embodiment of the present invention, a second method is described that includes the steps of reading a project data structure identifying a number of modules, identifying a number of imported symbols used in the number of modules, identifying at least one needed component based on at least one of the number of imported symbols, and identifying the at least one needed component as a respective at least one required component where the at least one needed component is not identified as present in the project data structure.

Furthermore, according to a first exemplary/preferred embodiment of the present invention, a system is described which includes component descriptions of a number of operating system components, an object module examination utility configured to receive a number of object modules and output symbol names and attributes for a number of imported symbols in the number of object modules, and a project analysis utility configured to receive the symbol names and attributes and output a number of needed components based on the symbol names and attributes and the component descriptions.

DETAILED DESCRIPTION

A first exemplary embodiment of an IDE according to the present invention includes a project facility (a tool residing on the host) that automatically determines if the application requires any components that are not included in the operating system 140 and allows a user of the project facility to add the required components to the operating system 140.

Figure 1:
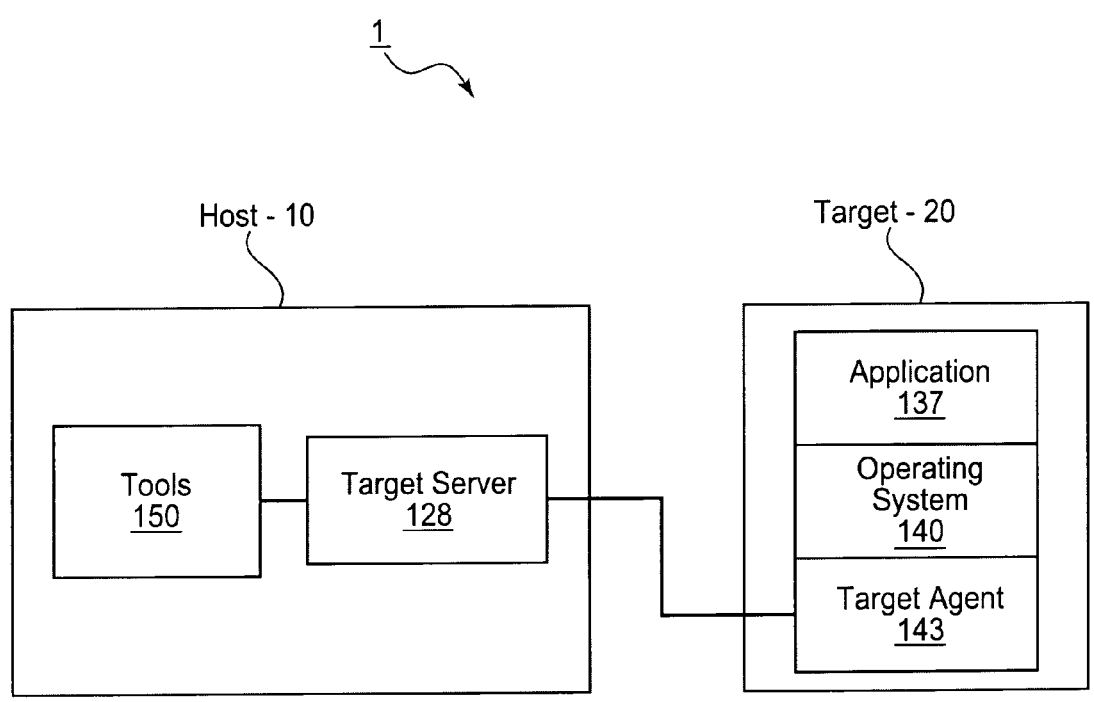
FIG. 1 shows a block diagram illustrating an integrated development environment.
Figure 2:
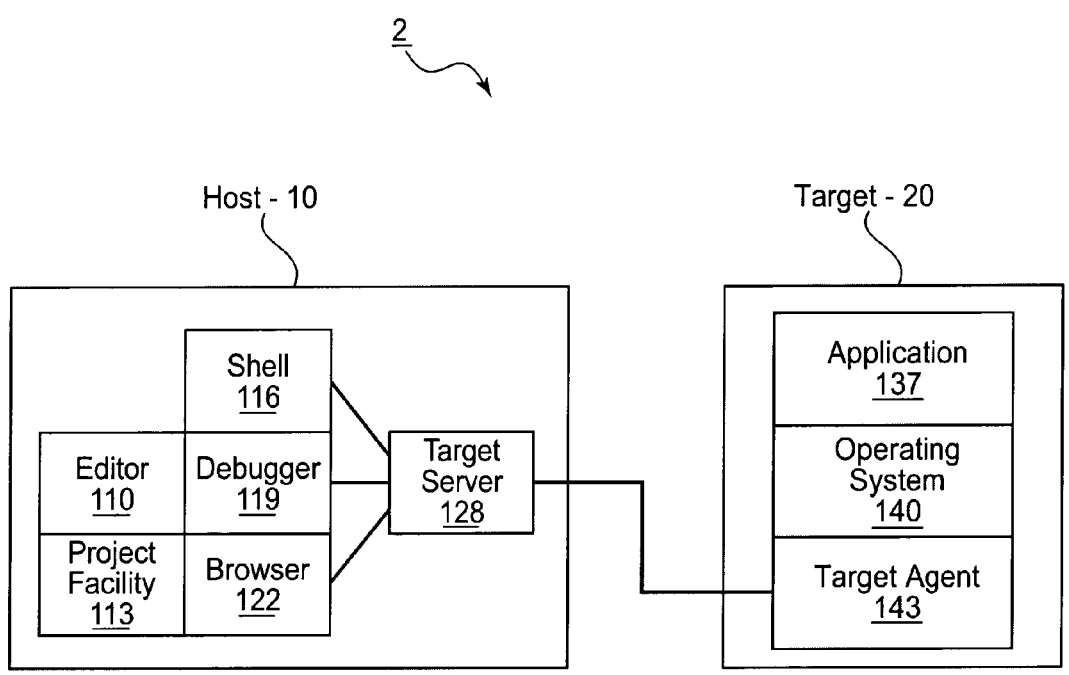
FIG. 2 shows a block diagram illustrating an integrated development environment of a first exemplary embodiment according to the present invention.

FIG. 2 shows a block diagram illustrating the first exemplary IDE 2. In FIG. 2, the host 10 may include a number of tools such as an editor 110 used to edit the source-code in which the application 137 is written. The host 10 may also include a project facility 113 that provides graphical and automated mechanisms for, among other things, creating applications that can be downloaded to the target 20, and for configuring the operating system 140 with selected components. For example, various networking and file system components may be required for one application and not another, and the project facility 113 provides a simple means for either including them, or excluding them from the operating system 140.

The host 10 may also include a shell 116 that acts as a command interpreter that provides access to operating system routines and dispatches requests to the target server 128 for any action involving target-resident programs or data. The host 10 may also include a debugger 119 which is used to debug an application program by, for example, setting breakpoints in the application 137 or controlling its execution. The host 10 may also include a browser 122 which is used to monitor the state of the target 20. The browser 122 provides detailed information about objects (e.g., tasks, semaphores, message queues, etc.) running on the target 20.

The exemplary project facility 113 according to the present invention provides mechanisms for:
Organizing the files that make up a project.
Grouping related projects into a workspace.
Customizing and scaling the operating system 140.
Adding application initialization routines to the operating system 140.
Defining varied sets of build options.
Downloading application objects to the target.

The project consists of source code files, build settings, and binaries that are used to create a downloadable application, or a custom version of the operating system 140 (called a bootable application). The downloadable application consists of one or more relocateable object modules, which can be downloaded and dynamically linked to the operating system 140, and then started from the shell 116 or the debugger 119. Dynamically linked means that object modules can be loaded onto a running system. The object module ("module") is source code which has been compiled using a compiler. The module is an intermediate form in the process of compiling application code from higher level language into machine executable code. The bootable application consists of an application linked to a custom version of the operating system 140. A project may be either a bootable project or a downloadable project.

A "scalable" operating system is statically partitioned into units of functionality that (1) expose interface(s) to the underlying hardware and (2) expose interfaces to units of software that extend the operating system. These units of extensibility are called project facility software components ("components"). Components are operating system facilities that can be built into, or excluded from, a custom version of the operating system 140. A component may include, among others, the following items: modules; a list of symbols causing the modules to be linked into the project; a description of constraints; parameters; and parameter values.

For a component to run properly, that particular component may have initialization code that needs to be executed. If a component does require that initialization code be executed, then that code must be executed in a certain order. For example, to access a network, an FTP server component should be started only after a network stack component is started.

Figure 3:
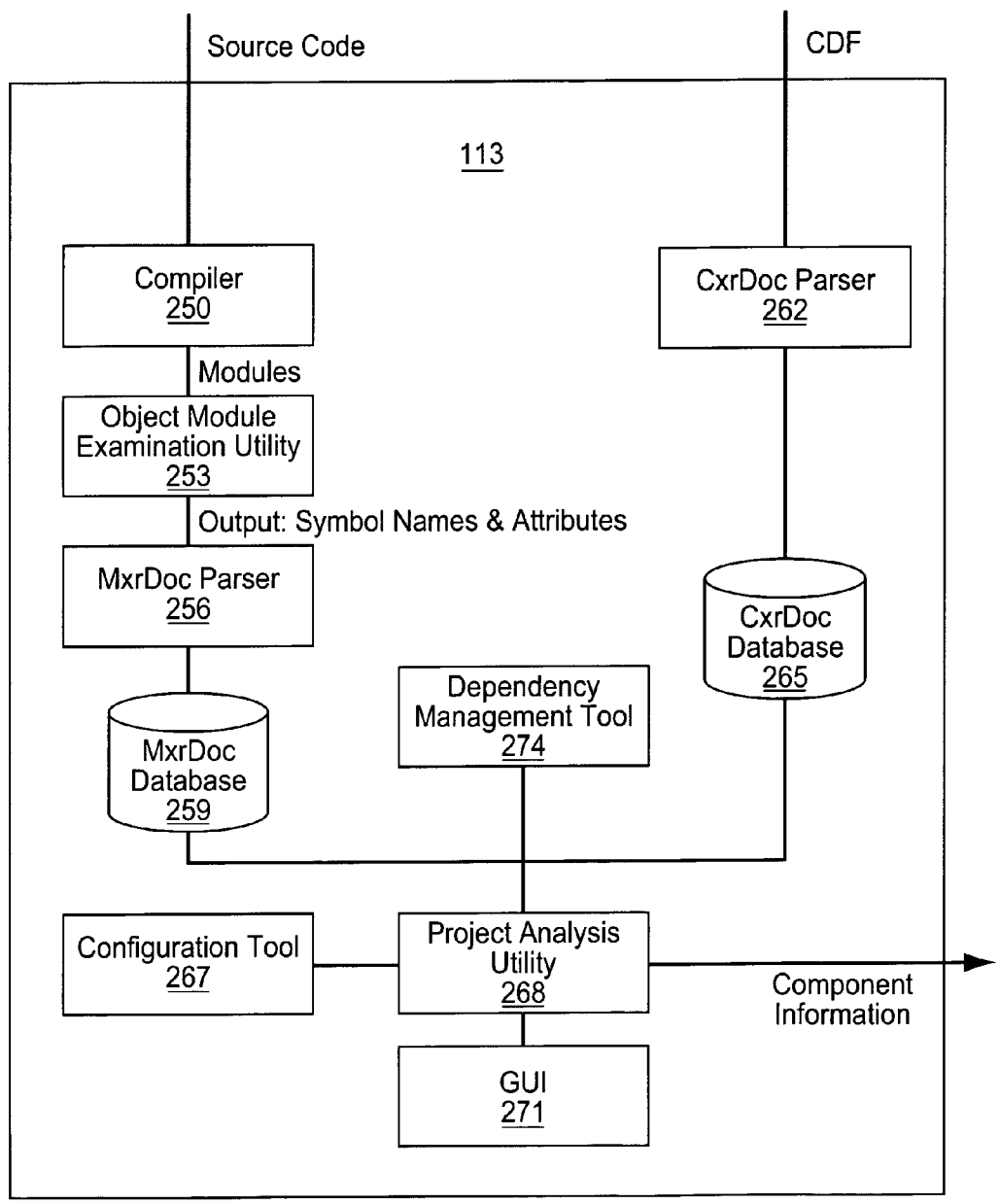
FIG. 3 shows a block diagram of a project facility of the first exemplary embodiment according to the present invention.

FIG. 3 shows a block diagram of the exemplary project facility 113 according to the present invention. The project facility 113 includes a compiler 250 which compiles the application source code into modules (the module is defined earlier in the application). The output from the compiler 250 is sent to an object module examination utility 253 which reads the modules and identifies all symbols either exported or imported by the modules. The outputs of the object module examination utility 253 are symbol names and attributes (such as whether a particular symbol is imported or exported). These outputs are sent to an mxrDoc parser 256 which, using the outputs, populates a module cross-reference ("mxrDoc") database 259. The mxrDoc database 259 is a database containing one or more symbols and modules. The mxrDoc database 259 allows for determining whether a specific module exports or imports a specific symbol.

Referring to FIG. 3, a cxrDoc parser 262 is also included in exemplary project facility 113, and takes as an input a component description file ("CDF"). CDFs are data files that describes for a given computing environment all the components that could be in the bootable project. The output of the cxrDoc parser 262 is used to populate a component cross-reference ("cxrDoc") database 265. The cxrDoc database 265 is a gallery of components and modules that can possibly be used in a bootable project. The cxrDoc database 265 maps modules to components and also indicates the components required by other components.

In addition to modules and components, the cxrDoc database 265 may also include the following objects: (1) parameters (initial values), (2) InitGroup (determines relative order of when components get initialized); (3) folder (groups components for display purposes; also allows user to add multiple components simultaneously); (4) selection (ensures that a particular interface is satisfied, e.g., only one network driver is selected for the TCP/IP stack); and (5) symbols.

A project analysis utility 268 may be coupled to the mxrDoc database 259 and the cxrDoc database 265 and is used to analyze the information in the mxrDoc database 259 and the cxrDoc database 265 in order to, for example, determine the set of operating system components which are needed by a particular application. The project analysis utility 268 includes the autoscale function. The project analysis utility 268 outputs component information, such as the components which are needed by a particular application. A configuration tool 267 is coupled to the project analysis utility 268. The configuration tool 267 is used to build a bootable project. The bootable project includes the source code files, build settings, and binaries that are used to create the downloadable application or the bootable application. A GUI 271 is coupled to the project analysis utility 268 and may allow a user of the project facility to, for example, add a set of needed components to the operating system 140.

A dependency management tool 274, using the mxrDoc database 259 and the cxrDoc database 265, determines component dependencies each time a component is included or excluded. That is, it determines if a component which is to be included is dependent upon other components that have not been included in the bootable project, or if a component that is to be deleted is required by other components. When a component is included, any dependent components are automatically included. When a component is excluded, any dependent components are also excluded.

In this first exemplary embodiment, an autoscale feature of the project facility 113 determines if the application source code requires any components that are not included in the bootable project, and adds them as instructed by the user of the project facility. It also provides information about components that are not required by the application and thus can be removed.

In the first exemplary embodiment, the autoscale feature has two phases: (1) the "scale up" phase which entails enumeration and inclusion of the components needed by the application; and (2) the "deadwood removal" phase which indicates the components that may not be needed by the application.

Figure 4:
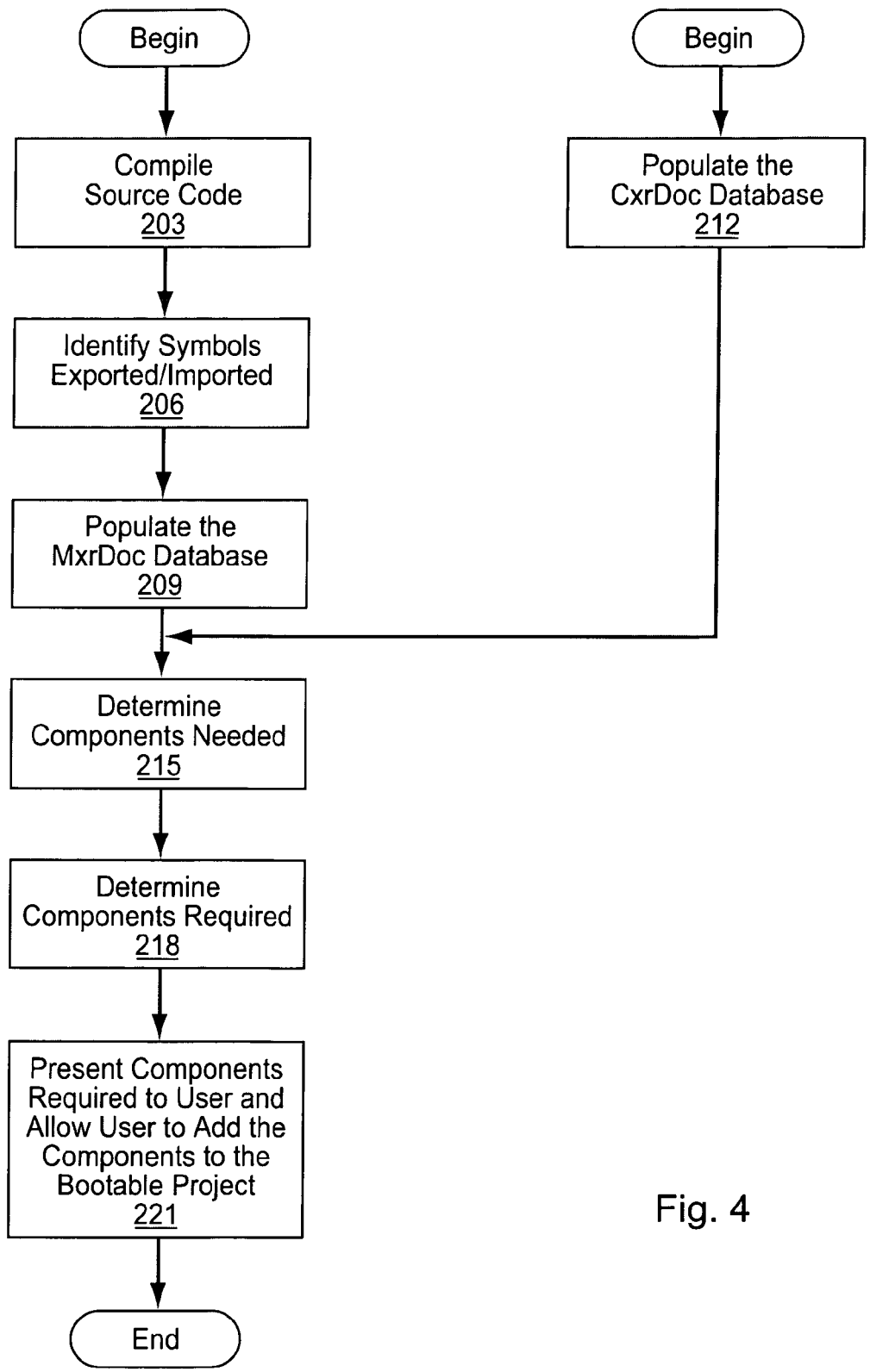
FIG. 4 shows a flow chart for steps involved in a scale up phase of autoscaling in the first exemplary embodiment according to the present invention.

FIG. 4 shows a flow chart for an exemplary set of steps involved in the scale up phase of autoscaling according to the first exemplary IDE embodiment. In step 203, the application source code, which may be written in a programming language such as "C", is compiled. As stated earlier, the compiled source code may be referred to as one or more "modules". In step 206, the modules are fed to an object module examination utility 253 which reads each module and identifies any symbols in the module as either exported or imported by the module.

In step 209, the mxrDoc database 259 is populated by streaming the output of the object module examination utility 253 to the mxrDoc parser 256 which uses the output to populate the mxrDoc database 259. The output streamed from the object module examination utility 253 is, for example, symbol names and attributes (such as whether a particular symbol is imported or exported).

Figure 5:
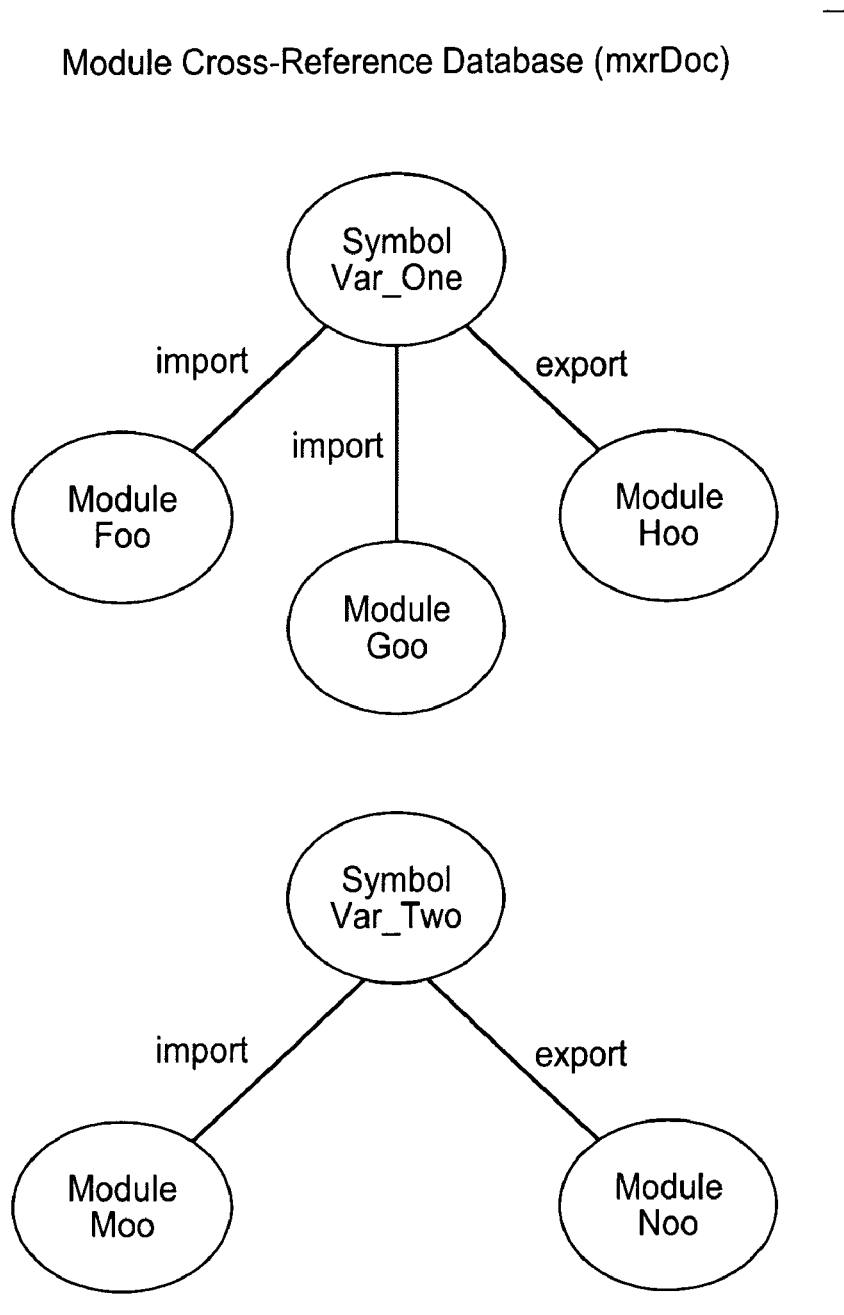
FIG. 5 shows a diagram illustrating an example of a module cross-reference database.

FIG. 5 shows a diagram illustrating an example of the mxrDoc database 259. The mxrDoc database 259 is a database containing one or more symbols and modules. A symbol is a name that represents a memory location of a code or data structure. The symbol may be: (1) produced (exported) and thus made available to others; (2) private (unavailable to other modules); or (3) unresolved and thus must come from elsewhere (imported).

The symbol may have a name such as "var_1", which may be associated with a value representing a memory location. Modules may also be named. For example, a particular module may have the name "foo" and thus can be referenced by, for example, other modules by using the name "foo".

Referring to FIG. 5, in the exemplary mxrDoc database 259, a symbol "var_one" is imported (i.e., used) by a module foo; the symbol var_one is also imported by a module "goo"; and the symbol "var_one" is exported (i.e., produced) by a module "hoo". In addition, a symbol "var_two" is exported by a module "moo", and imported by a module "noo".

The mxrDoc database 259 maps symbols to modules. The mxrDoc database 259 allows for determining whether a specific module exports or imports a specific symbol. For example, in FIG. 5, to find all modules that import the symbol var_one, the edges of a graph in the mxrDoc database 259 are traversed to find that the module "foo" and the module "goo" import the symbol "var_one".

Referring to FIG. 4, in step 212, the cxrDoc database 265 is populated by streaming the CDF to the cxrDoc parser 262, which processes the CDF and populates the cxrDoc database 265. The mxrDoc database 259 and the cxrDoc database 265 are populated independently of each other.

Figure 6:
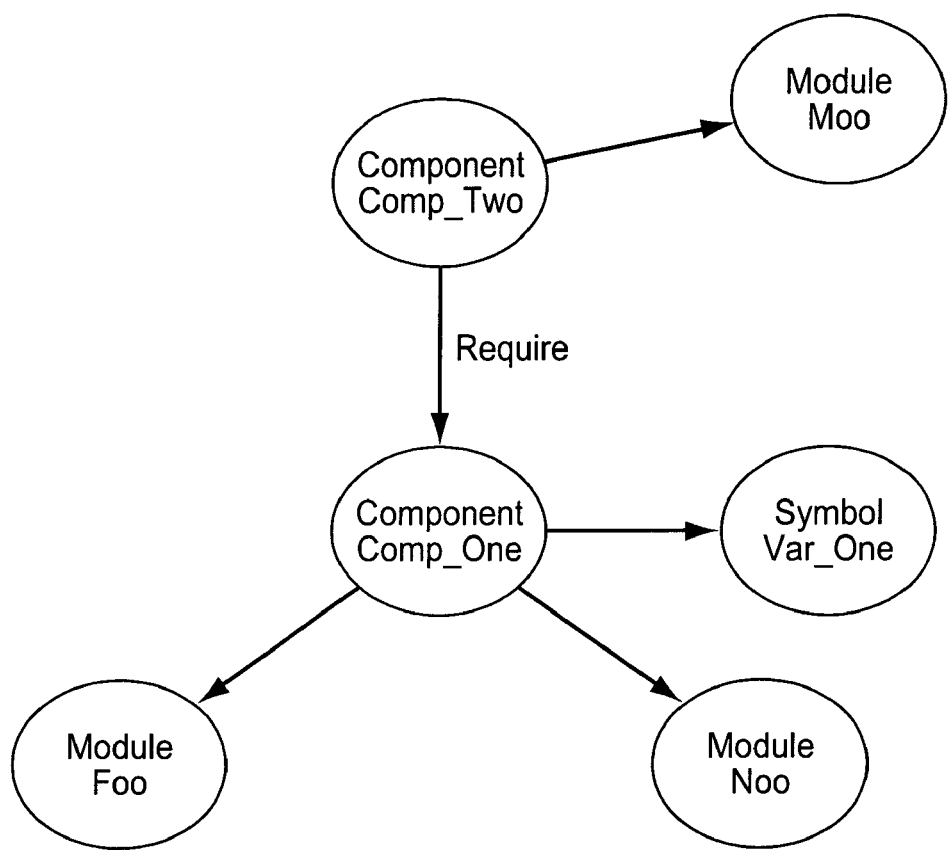
FIG. 6 shows a diagram illustrating an example of a component cross-reference database.

FIG. 6 shows a diagram illustrating an example of the cxrDoc database 265. As mentioned earlier, the cxrDoc database 265 is a gallery of possible components and modules that may be present in a project. The cxrDoc database 265 maps, for example, modules to components. In FIG. 6, module foo and module noo are mapped to a component "comp_one". The cxrDoc database 265 also indicates which components are required by other components. In FIG. 6, component comp_one requires a component "comp_two" and therefore component comp_one is dependent on component comp_two.

Referring to FIG. 4, in step 215, the project analysis utility 268 determines the operating system components needed (the "needed set") by the application. In order to determine the needed set, a query is run against the mxrDoc database 259 and the cxrDoc database 265 to determine those symbols that are imported by the application modules and exported by the operating system components. The needed set are those components exporting symbols which are not exported by the components currently available in a particular bootable project. The needed set may also include components which are specified as being required when a certain condition is satisfied (e.g., the "include when" command can be used to include component "C4" when component "C1" and component "C2" are present). The particular bootable project is dependent on the needed set, and the set of components in the needed set will be linked to the particular bootable project at the time the particular bootable project is built. In step 218, the project analysis utility 268 determines the set of operating system components which are required (the "required set") by the particular bootable project. The required set is found by subtracting the set of components presently in the bootable project (the "present set") from the needed set.

As an example of using the mxrDoc database 259 and the cxrDoc database 265 to determine the present set, the needed set, and the required set, referring to FIG. 5, assume that module noo is located in component comp_one and that component comp_one resides in a bootable project "boot_proj_one". Also, assume that module moo is located in component comp_two and component comp_two resides in a bootable project "boot_proj_two". Running the exemplary autoscale function for boot_proj_one and in particular comp_one, the mxrDoc database 259 (in FIG. 5) shows that module moo exports the symbol var_two and that module noo imports the symbol var_two. Therefore, module noo is dependent on module moo. The cxrDoc database 265 (in FIG. 6) shows that module moo resides in comp_two and that module noo resides in comp_one. Running the exemplary autoscale function for boot_proj_one finds the present set to equal comp_one. The needed set for boot_proj_one is comp_one and comp_two (i.e., module noo in comp_one depends on module moo in comp_two). The required set is the present set subtracted from the needed set which results in the required set equaling comp_two. Because comp_two is required to define var_two, comp_two should be included in boot_proj_one (i.e., comp_two will be linked to boot_proj_one at the time of its build).

Figure 7:
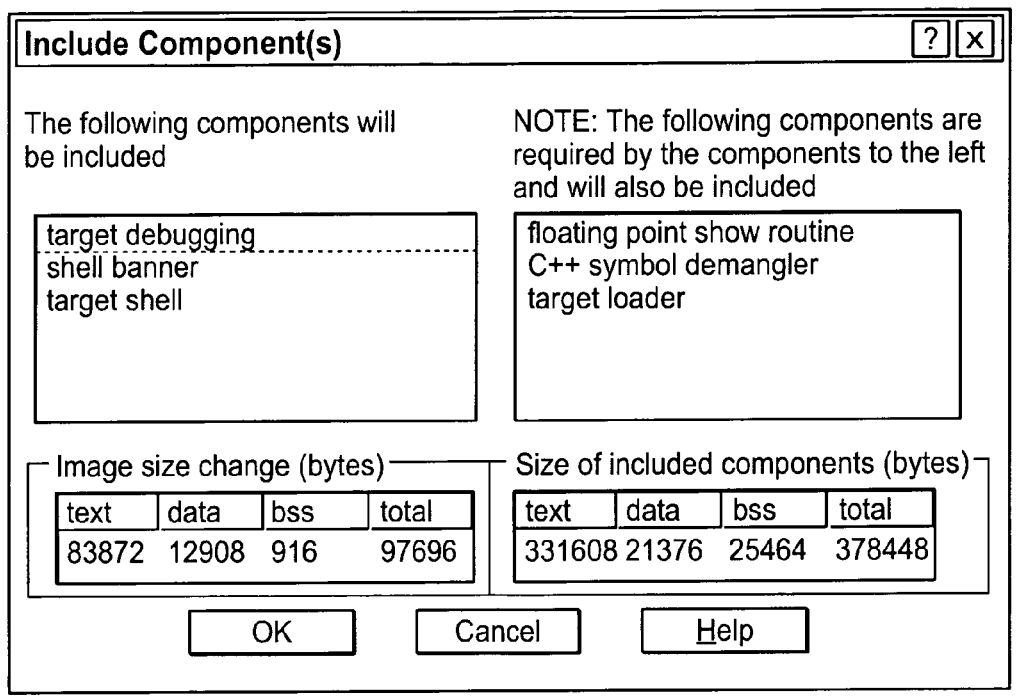
FIG. 7 shows a graphical user interface ("GUI") allowing a user to add components in a required set in the first exemplary embodiment according to the present invention.

Referring to FIG. 4, in step 221, the project analysis utility 268 presents the components in the required set to a user of the project facility via the GUI 271. The user has the option to add the components in the required set to the bootable project. FIG. 7 shows a first display example from graphical user interface 271 that allows the user to add the components in the required. In FIG. 7, the components in the left box indicate the components that the user wishes to add to the bootable project. The components in the right box are the components which are required by the components in the left box. By selecting the "OK" button, the components in the right box will be added to the bootable project.

In the first exemplary embodiment, the deadwood removal phase of autoscaling may be implemented by subtracting the needed set from the present set to suggest components that are not needed and thus at the user's option, those unneeded components can be removed from the bootable project.

In a second exemplary embodiment of the project facility according to the present invention, the project facility supports the use of "protection domains" by the operating system 140. A protection domain system segregates a computing environment into a number of "protection domains." Each protection domain is a "container" for system resources, executable code and data structures, as well as for executing tasks and system objects (such as semaphores and message queues). Each resource and object in the system is "owned" by exactly one protection domain. The protection domain itself is a self-contained entity, and may be isolated from other system resources and objects to prevent tasks executing in the protection domain from potentially interfering with resources and objects owned by other protection domains (and vice versa).

The protection domain system also, however, provides mechanisms by which tasks executing in one protection domain may access resources and objects contained in a separate protection domain. Each protection domain includes a "protection view" that defines the system resources and objects to which it has access (i.e., the resources and objects which it can "see"). By default, each protection domain has a protection view that includes only the system resources and objects contained within that protection domain. However, a protection domain may acquire access to the resources of other protection domains by "attaching" to these protection domains.

In this exemplary embodiment, the project facility supports three basic types of projects: systems, domains, and components. System projects contain collections of domains; domains contain collections of components; and components contain source files and modules. The domains of the project facility represent the protection domains implemented by the operating system on the target. Thus the project facility, by using domains within system projects, supports the use of protection domains by the operating system 140 running on the target 20.

The second exemplary embodiment of the project facility also includes an autoscale feature. The autoscale feature is implemented in three phases: (1) a "scale-up" phase to ensure that needed components are available in the system, allowing the user the option to add those needed components; (2) a "duplicate detection" phase that identifies redundant components; and (3) a "deadwood removal" phase that gives the user the option to remove unneeded components from their respective domains. The autoscale feature thus provides the minimum set of components needed for the system project to execute successfully.

In this embodiment, the system is effectively "componentized", i.e., the system is effectively composed entirely of components. When new source code is added to the system, the autoscale feature componentizes the new source code (i.e., the source code is included in a component) and information associated with the new source code (e.g., modules and symbols associated with the source code) is added to the mxrDoc database and the cxrDoc database. Because the new source code is componentized and information about the new source code is inserted into the cxrDoc database, the dependency management tool (for example, dependency management tool 274 shown in FIG. 3) is merged into the autoscale feature (i.e., the project analysis utility includes the functionality of the dependency management tool).

In the second exemplary embodiment, taking advantage of the fact that everything in the system is componentized (including new user code), the component description file ("CDF") may include dependencies between components which may otherwise be missed. If new user source code is not componentized then the autoscale feature may not find an accurate list of dependencies (e.g., some component dependencies may not appear when using ordinary symbolic analysis).

In this exemplary embodiment, because it cannot be known a priori what other components will be available in other domains in a given system when a domain is created, autoscale operates in the context of a system project (i.e., a system project is autoscaled rather than only a domain). The exception is that a kernel domain can be autoscaled by itself.

In the second exemplary embodiment, the cxrDoc database may also include the following objects: (1) domains (a static description of a protection domain); (2) a symbol exported by this component, available for linkage to a component in another domain (EntryPoint); (3) an object describing a region of memory (PhysRegion); and (4) an object managing the regions of memory available on the target 20 (PhysRegionTable).

Figure 8:
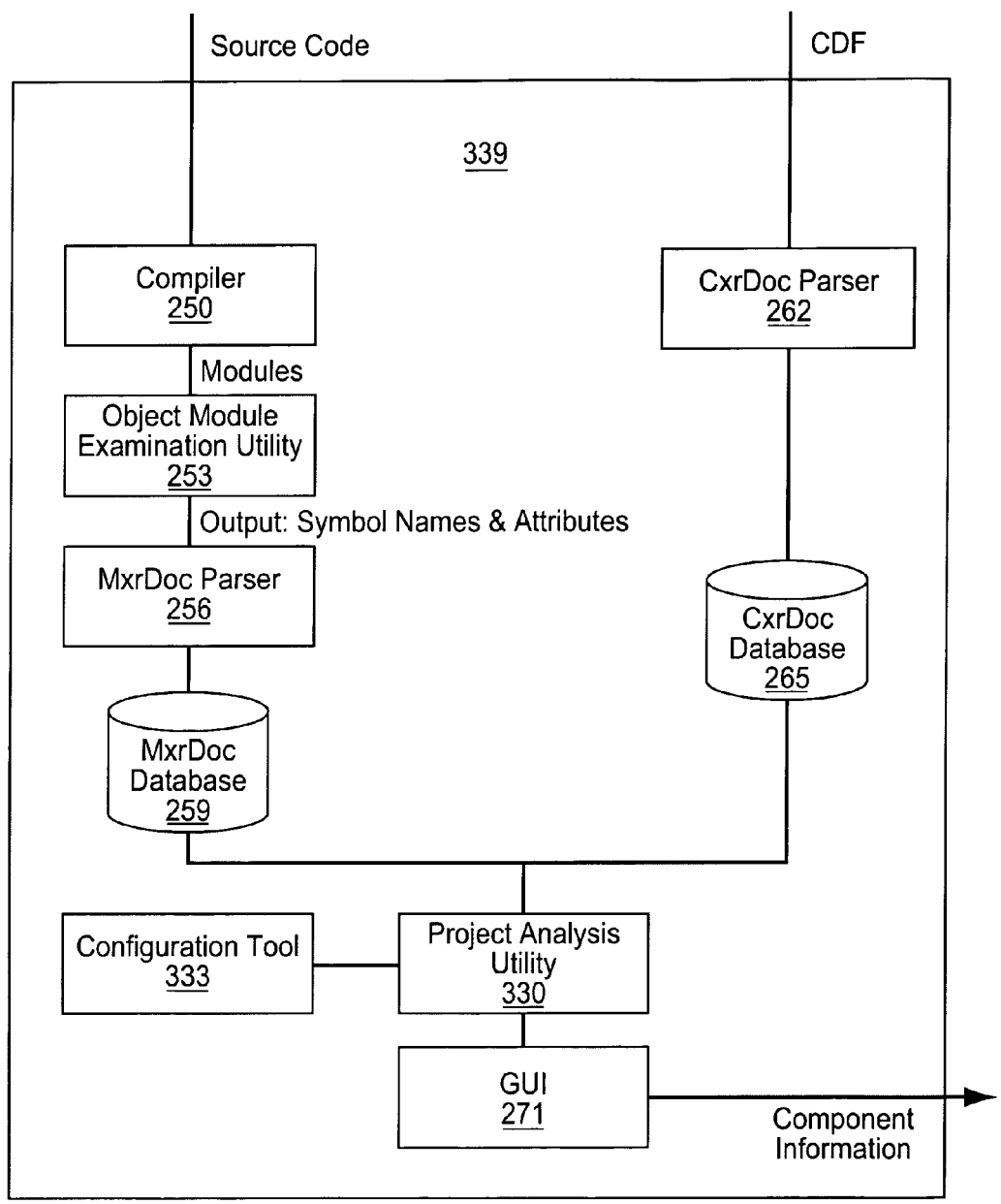
FIG. 8 shows a block diagram of a project facility of a second exemplary embodiment according to the present invention.

FIG. 8 shows a block diagram of the exemplary project facility 339 according to the second exemplary embodiment. In FIG. 8, a configuration tool 333 may be used to configure the set of domains in a system and also to populate the domains with components. A project analysis utility 330 may be used to analyze the information in the mxrDoc database 259 and the cxrDoc database 265 in order to, for example, determine the set of operating system components and application components which are needed by each of the multiple domains of a particular system. The project analysis utility 330 also performs those tasks that were delegated to the dependency management tool 274 of the first embodiment (see FIG. 3; the tasks include the task of finding component dependencies each time a component is included or excluded), and thus the dependency management tool 274 has been merged into the project analysis utility 330.

Figure 9:
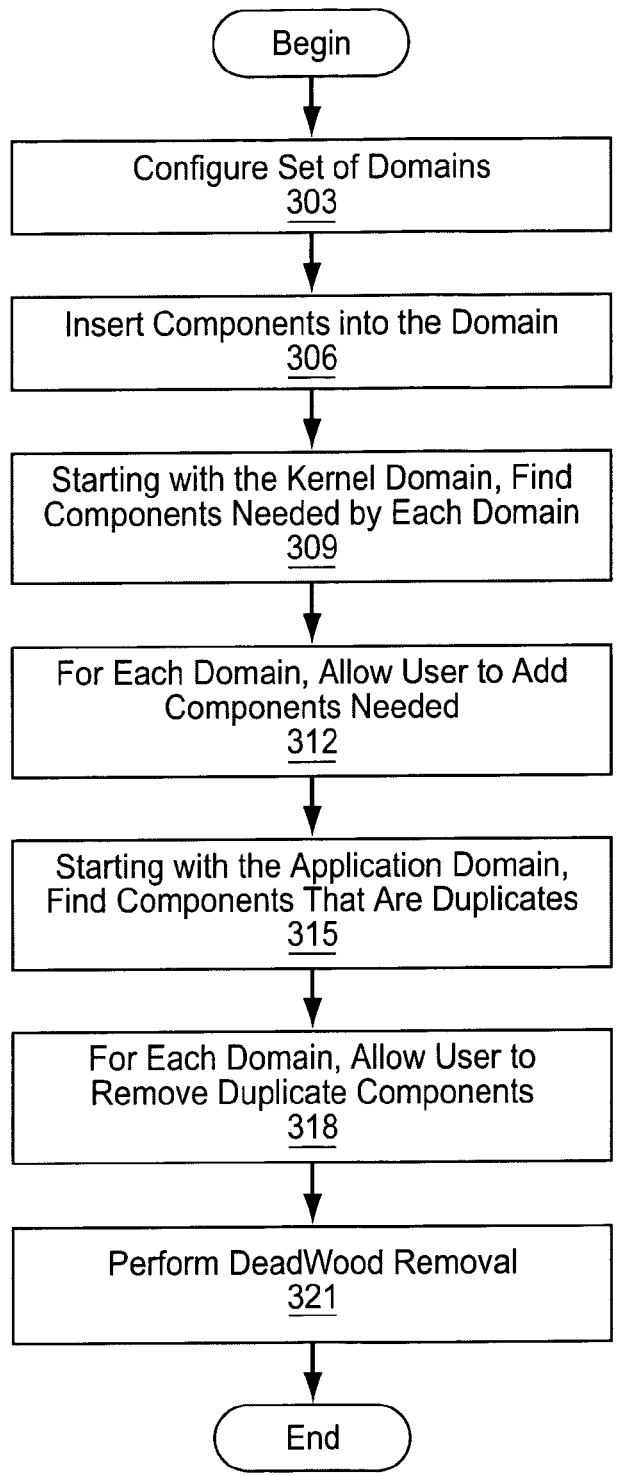
FIG. 9 shows a flow chart illustrating autoscaling steps used in the second exemplary embodiment according to the present invention.
Figure 10:
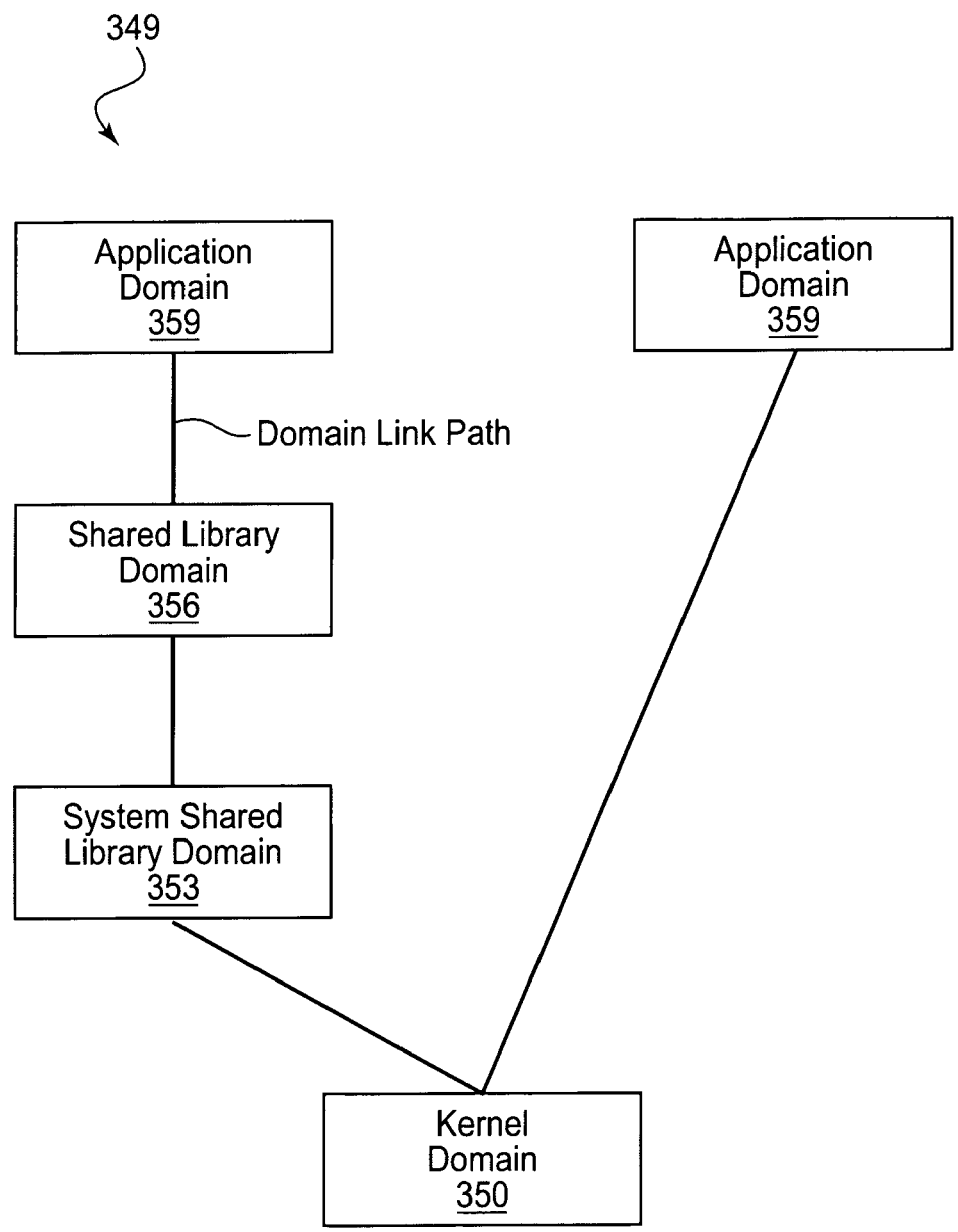
FIG. 10 shows an exemplary system project of the second exemplary embodiment according to the present invention.

FIG. 9 shows a flow chart illustrating exemplary steps of the autoscale feature according to the second exemplary embodiment. In step 303, the set of domains of a system project are created and configured. FIG. 10 shows an example of a system project 349 for purposes of illustrating this second exemplary embodiment. The system project 349 includes a kernel domain 350 which may contain all the kernel functions and data elements, and maybe used to provide the memory for all system objects (e.g., semaphores and message queues). The system project 349 may also include zero or more system shared library domains 353 which contain operating system components that require more access than the kernel domain's protection view allows. The system project 349 may also include zero or more shared library domains 356 which are domains that export functions or data for use by other domains. The system project 349 may also include zero or more application domains 359 (as shown, two application domains 359a and 359b are used in exemplary system project 349) which are domains that may reference the modules, system objects such as semaphores, and memory required by a specific application, the application domains 359 contain components and these components reference the modules.

In step 303, the access privileges for each of the domains is also specified, i.e., the other domains to which a particular domain has access. The path created by one domain being able to access another domain results in a domain link path or an inter-domain link path. The domain link path or inter-domain link path is an ordered list of domains against which otherwise unresolved external symbol references (imports) are resolved by the linker. In other words, the linker matches these imports against exported symbols in the domains listed in the path. An example of a domain link path is shown in FIG. 10.

Figure 11:
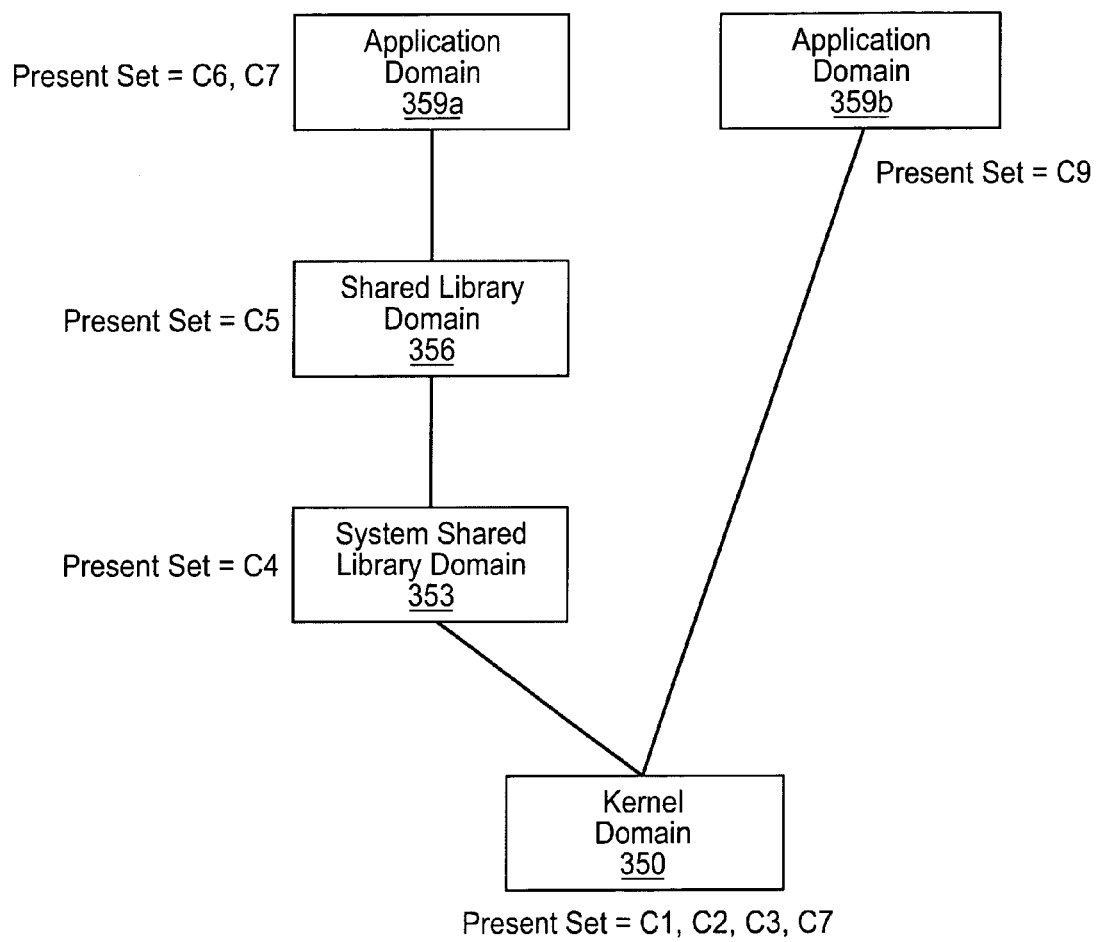
FIG. 11 is an example of the application of the second exemplary embodiment to find a set of present components for domains in the system project, according to the present invention.

In step 306, components are inserted into the domains. In this step, the us er, invoking the configuration tool 333, may insert the desired components into a particular domain. FIG. 11 is an example of the application of the second exemplary embodiment to find a set of present components for the domains in the system project. In FIG. 11, a list, denoted the "present set", is maintained specifying the components, as selected by the user, in each of the domains. The kernel domain 350 includes the following components: C1, C2, C3, and C7. The system shared library domain 353 includes the following component: C4. The shared library domain 356 includes the following component: C5. The application domain 359a includes the following components: C6 and C7. The application domain 359b includes the following component: C9.

Step 303 and step 306 are preprocessing steps and are performed by the configuration tool 333. In the second exemplary embodiment, the configuration tool 333 may be used to create/configure systems, domains, and components. In the first exemplary embodiment, however, the configuration tool 267 did not have to create/configure multiple domains because there was effectively only one domain and only two projects available—the bootable project and the downloadable project.

Figure 12:
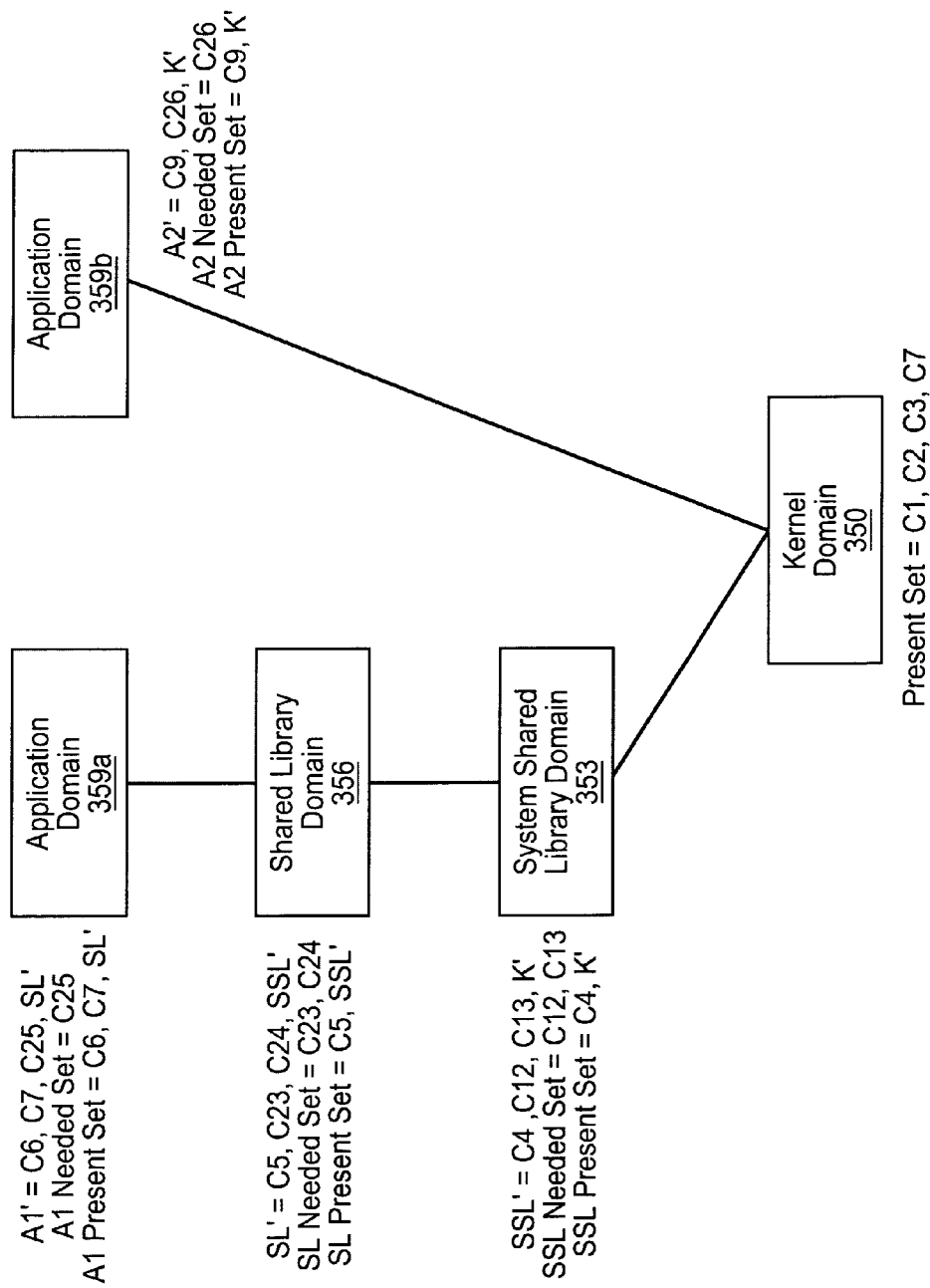
FIG. 12 is an example of the application of the second exemplary embodiment to find a set of needed components for domains in the system project, according to the present invention.

Referring again to FIG. 9, in step 309, the components needed by each domain are found. The scale-up phase starts at step 309. FIG. 12 is an example of the application of the second exemplary embodiment to find a set of needed components for the domains in the system project. The scale-up phase begins at the lowest hierarchical level (the kernel domain 350) and progresses up to the highest hierarchical level (the application domains 359a and 359b). With regards to the kernel domain 350, a temporary list is maintained, which may be denoted the "present set", which contains the set of components currently in the kernel domain 350. In FIG. 12, the present set contains the following components: C1, C2, C3, and C7. The components needed by the present set can be maintained in a list denoted the "needed set". Finding the components needed is done according to the first exemplary embodiment as discussed above with reference to FIG. 5 and FIG. 6 (i.e., analysis of mxrDoc database 259 and cxrDoc database 265 indicate that components C1, C2, C3, and C7 require components C5 and C11). In FIG. 12, the needed set contains the following components: C8 and C11. The components needed will be assumed to be added to the domain and another list is maintained, which may be denoted K', which contains the components of the present set added to the components of the needed set. K' thus represents a complete list of all the components needed at this layer (the lowest hierarchical level).

Moving up the hierarchy to the system shared library domain 353, the present set for the system shared library domain 353 contains the following components: C4 and K'. K' is in the present set for the system shared library 353 because the components present (and needed) by the kernel domain 350 are assumed to have been added to that domain for purposes of the determination, and the system shared library domain 353 is effectively considered to have access to all those components (the components in the kernel's needed set and present set). The components needed by the system shared library 380 can be maintained in a list denoted SSL "needed set". Finding the components needed by the system shared library domain 353 is done according to the first exemplary embodiment as discussed above. In FIG. 12, the SSL needed set is found to contain the following components: C12 and C13. The components determined to be needed by the system shared library 353 will be assumed to be added to the system shared library domain 353, and a new list is maintained, which may be denoted SSL', which contains the components of the SSL present set, and the components of the SSL needed set. This procedure of finding the present set, the needed set, and a set representing the combination of these two sets is repeated for each system shared library domain in the system project. Finding SSL' for each system shared library domain 353 represents a complete list of all the components needed at that layer, via a particular domain link path (the shared library's domain link path).

Again, moving up the hierarchy to the shared library domain 356, the present set for the shared library domain 356 contains the following components: C5 and SSL'. The components needed by the shared library domain 356 can be maintained in a list denoted SL "needed set". Finding the components needed by the shared library domain 356 is done according to the first exemplary embodiment as described above. In FIG. 12, the SL needed set is found to contain the following components: C23 and C24. The components needed will be assumed to be added to the shared library domain 356, and a new list is maintained, which may be denoted SL', which contains the components of the SL present set, and the components of the SL needed set. This procedure of finding the present set, the needed set, and a set representing the combination of these two sets is repeated for each shared library domain in the system project. Finding SL' for each shared library domain 356 represents a complete list of all the components needed at that layer, via a particular domain link path (the shared library's domain link path).

Moving up the hierarchy to the application domain 359a, the present set for this domain contains the following components: C6, C7, and SL'. The components needed by the application domain 359a can be maintained in a list denoted A1 "needed set". Finding the components needed by the application domain 359a is done according the first exemplary embodiment as described above. In FIG. 12, the A1 needed set is found to contain the following component: C25. The components needed will be assumed to be added to the domain and a new list is maintained, which may be denoted A1', which contains the components of the A1 present set, and the components of the A1 needed set.

For the application domain 359b, the present set for this domain contains the following components: C25 and K'. K' is in the A2 present set because for this application domain 359b, the domain link path connects directly to the kernel domain 350, rather than to the shared library domain 356 or system shared library domain 353, as is the connection for the application domain 359a (as a result, the application domain 359b does not have access to the components in the shared library domain 356 or the system shared library domain 353). The components needed by the application domain 359b can be maintained in a list denoted A2 "needed set". Finding the components needed by the application domain 359b is done according to the first exemplary embodiment discussed above. In FIG. 12, the A2 needed set is found to contain the following component: C26. The components needed will be assumed to be added to this domain and a new list is maintained, which may be denoted A2', which contains the components of the A2 present set, and the components of the A2 needed set. This procedure of finding the present set, the needed set, and a set representing the combination of these two sets is repeated for each application domain 359 in the system project. Determining a set representing the combination of the needed set and the present set for each application domain 359 represents a complete list of all the components needed at that layer, via a particular domain link path.

Throughout the above analysis of each of the domains of a particular system project, not only is the needed set of each domain tracked, but also to which domains the components in each needed set belong. Referring to FIG. 9, in step 312, the list of components in each needed set is presented to the user, ordered by, and identified with, the domains/libraries to which they must be added. The user may then override these selections by de-selecting any components.

Figure 13:
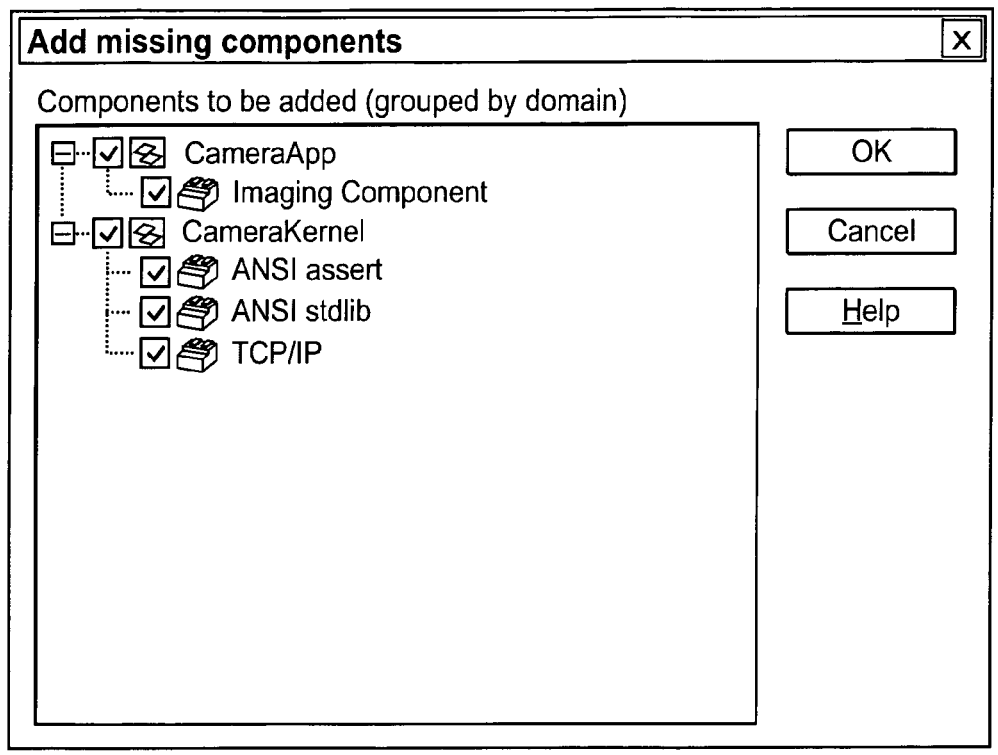
FIG. 13 shows a GUI that allows the user to de-select components from the needed set for each of the domains in a particular system project, according to the present invention.

FIG. 13 shows a display (provided by GUI 271) that allows the user to de-select components from the needed set for each of the domains in a particular system project. In FIG. 13, a check mark to the left of the component means that the component is selected and thus will be added to the corresponding domain. For example, in the "CameraApp" domain, the "Imaging Component" has a check mark to its left meaning that the component will be added to the "CameraApp" domain. By pressing the OK button, the user adds the selected components to the various domains.

Referring to FIG. 9, in step 315, the duplicate detection phase is performed. The duplicate detection phase searches for duplicate components. Duplicate components are those that can be found in more than one location in the same domain link path. For example, if a component occurs in both a kernel domain and an application domain, one of the two copies is a duplicate if both domains are "connected" by a domain link path.

Duplicate detection is useful in at least two situations: (1) the user creates a new system project from previously created domains (the previously created domains may contain components that can be safely removed from higher levels of the hierarchy because it already exists in lower levels of the hierarchy in the new system project); and (2) the user overrides autoscale's suggestions (the user introduces duplicates by adding components himself).

Duplicate detection begins with an application domain (the highest hierarchical level) and proceeds layer by layer along the application's domain link path (application domains, then shared library domains (if any), then system shared library domains (if any), and then the kernel domain) toward the kernel domain. If any of these layers contain components from the previous layer, these components are flagged for removal in the preceding layer(s). Duplicate components from the preceding layer are removed in order to have the least amount of effect on the other domains in the domain link path.

Figure 14:
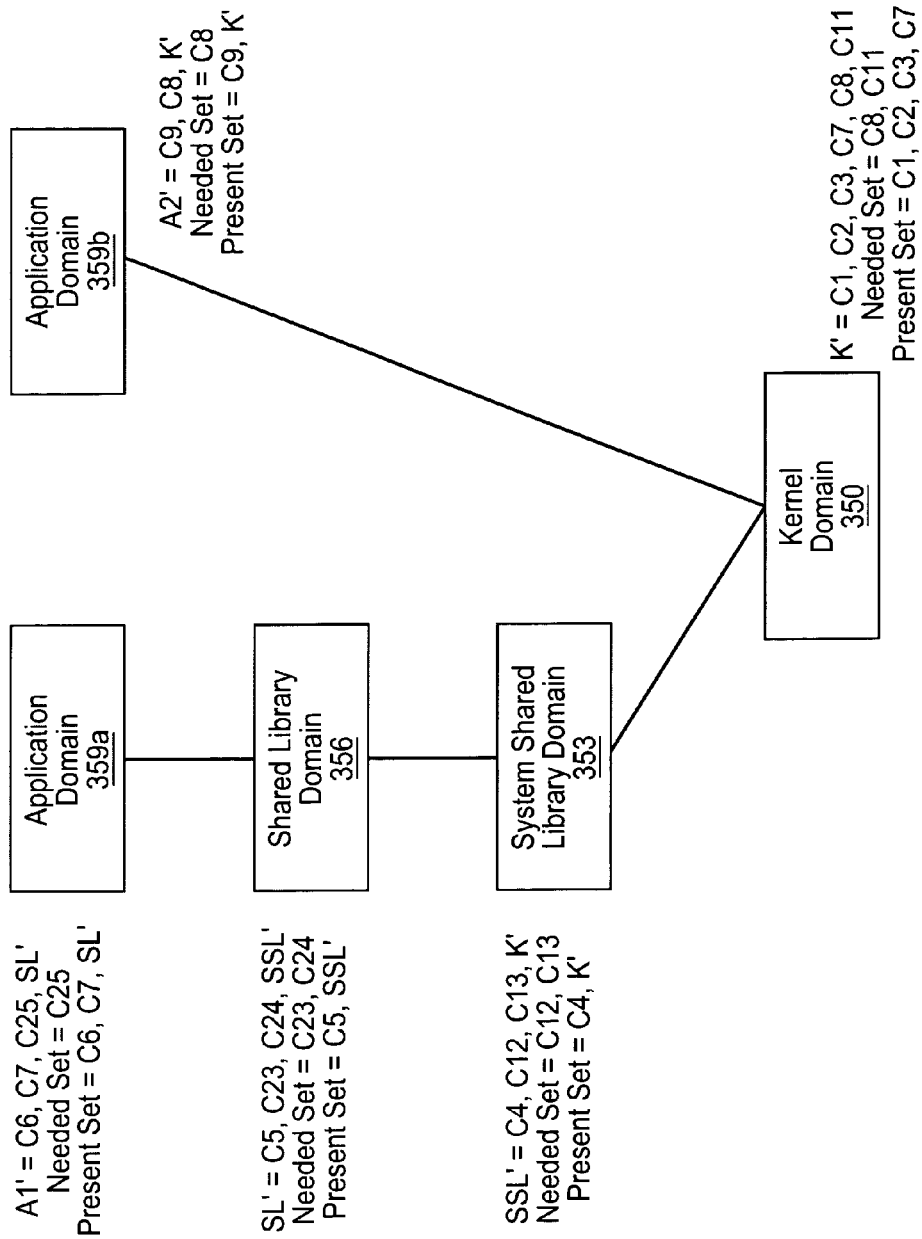
FIG. 14 is an example of the application of the second exemplary embodiment to find duplicate components residing in the domains of the system project, according to the present invention.

FIG. 14 is an example of the application of the second exemplary embodiment to find duplicate components residing in the domains of the system project 349. In FIG. 14, the application domain 359b will contain "C8" after the "scale-up" phase. This application domain 359 has access to the kernel domain 350. Because C8 is found in the kernel domain 356 and the application domain 359b, C8 will be flagged for removal from the application domain 359b (the duplicate component in the preceding layer, i.e., the highest layer, is flagged for removal).

Referring to FIG. 9, in step 318, the user is presented with a list of the duplicate components, ordered by, and identified with, the corresponding domain. By selecting components, the user may elect to have all, or some of, the identified components removed.

Figure 15:
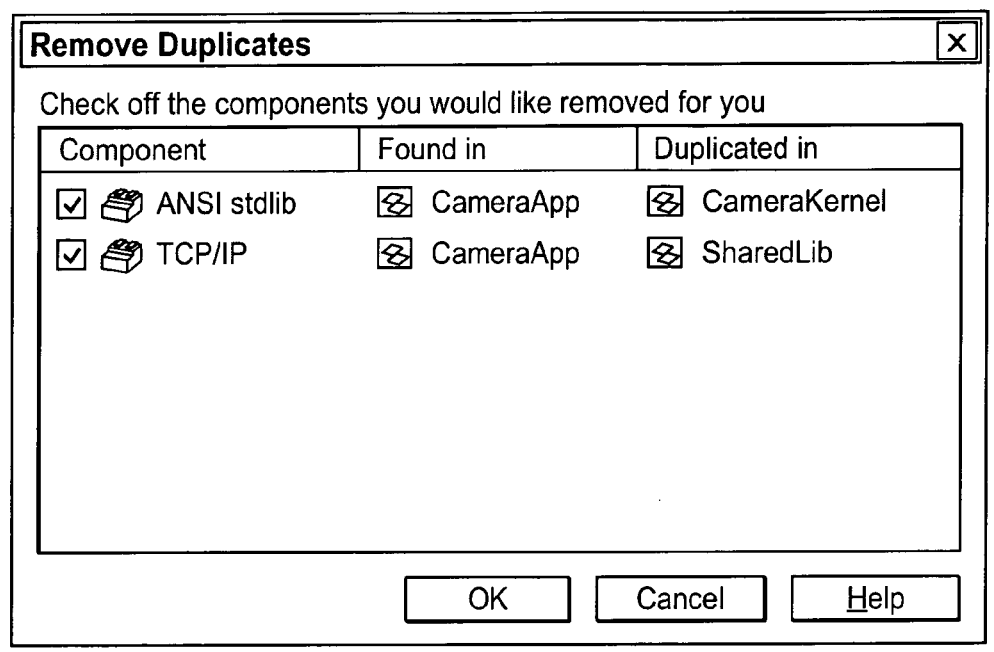
FIG. 15 shows a GUI that allows the user to remove duplicate components from a particular system project, according to the present invention.

FIG. 15 shows a display (provided by GUI 271) that allows the user to remove duplicate components from a particular system project according to the second exemplary embodiment. The window displays the duplicate components and the domains in which they reside for a particular system project. For example, in FIG. 15, a "ANSI stdlib" component is found in a "CameraApp" domain and a "CameraKernel" domain. If the ANSI stdlib component is selected for removal, then it will be removed from the CameraApp domain (the highest level of the hierarchy). The user selects a particular duplicate component for removal by placing a check mark to the left of the component.

Referring to FIG. 9, in step 321, deadwood removal is performed. In general, the goal of deadwood removal is to take two sets, the first constituting the components currently in the configuration and assumed to produce a working system (the present set) and the second, the set of those against which the user would like to perform deadwood removal (the "precious set"), and produce the largest possible set of components that can be safely removed while still producing a working configuration.

In the context of protection domains, that is, in the current embodiment, the "deadwood removal" (also known as "dead weight removal") operation takes as input two vectors of sets. The first vector represents the current configuration: each vector element corresponds to a domain and contains the domain's current set of components. The second vector corresponds to the precious sets, one for each domain.

Figure 16:
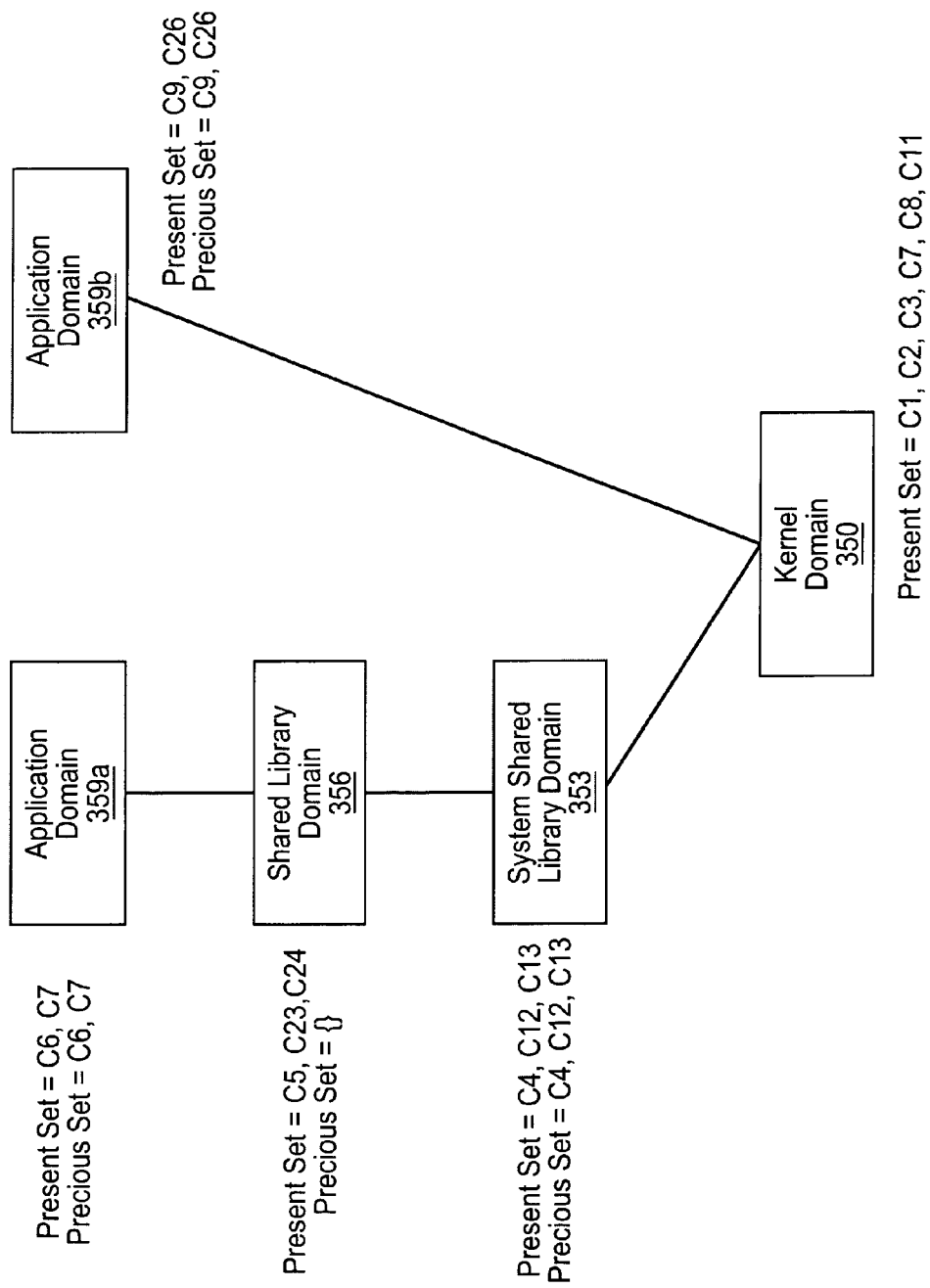
FIG. 16 is an example of the application of the second exemplary embodiment to remove duplicate components residing in the domains of the system project 349.

FIG. 16 is an example of the application of the second exemplary embodiment to remove duplicate components residing in the domains of the system project 349. In FIG. 16, the user has designated the following precious sets: {Application domain 359a: C6, C7}; (Application Domain 359b: C9, C26}; {System Shared Library SSL: C4}; {Kernel: none}. Assume that the set containing {C6, C7}, via closure, requires {C1, C2, C3, C4, C7, C11, C12, C23, C24}; also assume that the set containing {C9, C26} requires {C8}. Walking through each component in each domain's present set, we test first to see if that component is also in the domain's precious set or required (via closure) by any component in the precious set. If not, we add the component to the deadwood set. When we reach component C5 in the shared library domain 356, we learn that it is neither precious nor required by any precious component in the left-hand link path. C5 becomes the sole component in the deadwood vector.

The deadwood vector is then presented to a user of the project facility. The user may chose to allow the deadwood removal tool to remove the deadwood vector from the present vector. For the example of FIG. 16, C5 would be removed from the shared library domain 356.

In the preceding specification, the invention has been described with reference to specific second exemplary embodiments thereof. It will, however, be evident that various modifications and changes may be made thereunto without departing from the broader spirit and scope of the invention as set forth in the claims that follow. The specification and drawings are accordingly to be regarded in an illustrative rather than restrictive sense. Note that references to "a number of" or "at least one" or "a set of" herein shall mean one or more of the quantified element, whereas references to "a plurality of" shall mean two or more of the quantified element.

What is claimed is:

1. A method stored as a set of instructions that are executable by a processor, comprising:
    reading an object module and identifying a number of imported symbols, wherein the object module is compiled source code;
    identifying a needed component based on at least one of the number of imported symbols;
    identifying the needed component as a required component when the needed component is not identified as present in an operating system;
    displaying to a user, on a user interface, that the required component is not identified as present in the operating system;
    receiving an input from the user indicating the required component is to be loaded into the operating system; and
    loading the required component into the operating system after receiving the input.

2. The method of claim 1, wherein the step of identifying the needed component includes:
    identifying a component that exports the at least one of the number of imported symbols.

3. The method of claim 2, wherein the step of identifying the component that exports the at least one of the number of imported symbols is performed by parsing a component cross reference data structure.

4. The method of claim 1, wherein the operating system is defined in a bootable project.

5. A method stored as a set of instructions that are executable by a processor, comprising:
    reading a project data structure identifying a number of modules;
    identifying a number of imported symbols used in the number of modules by reading the number of modules, wherein the number of modules are compiled source code;
    identifying at least one needed component based on at least one of the number of imported symbols;
    identifying the at least one needed component as a respective at least one required component where the at least one needed component is not identified as present in an operating system;
    displaying to a user, on a user interface, that the at least one required component is not identified as present in the operating system;
    receiving an input from the user indicating that the at least one required component is to be loaded into the operating system; and
    loading the at least one required component into the operating system after receiving the input.

6. The method of claim 5, further comprising:
    storing representations of the number of imported symbols in a module cross reference data structure;
    wherein the step of identifying the at least one needed component based on at least one of the number of imported symbols uses the module cross reference data structure.

7. The method of claim 6, wherein the representations of the number of imported symbols include symbol names and attributes, and wherein the attributes include whether the symbol is imported.

8. The method of claim 5, wherein the project data structure defines a bootable application, and wherein the operating system is defined in the project data structure.

9. The method of claim 5, wherein the components include operating system components.

10. The method of claim 5, further comprising:
    reading at least one component description data structure for available components; and
    populating a component cross reference data structure with descriptions of the available components;

wherein the step of identifying at least one needed component includes parsing the descriptions of the available components in the component cross reference data structure.

11. The method of claim 10, wherein the at least one component description data structure is a file.

12. The method of claim 10, wherein the descriptions of available components include at least one of component names, module names, parameters, parameter initial values, initialization order, component grouping, selectivity and symbols.

13. The method of claim 10, further comprising:
identifying at least one dependency component that is required by the at least one required component.

14. The method of claim 13, wherein the step of identifying the at least one dependency component is performed using the component cross reference data structure and determining a dependency between the at least one required component and the at least one dependency component.

15. The method of claim 14, further comprising:
displaying identifiers for the at least one required component and at least one dependency component using a user interface.

16. The method of claim 5, further comprising:
requesting acknowledgment prior to adding the at least one required component to the operating system; and
adding the at least one required component to the operating system.

17. The method of claim 5, wherein the project data structure is a file.

18. The method of claim 5, further comprising:
identifying an unneeded present component of the operating system where a present component of the operating system is not included in the at least one needed component.

19. The method of claim 18, wherein the step of identifying the unneeded present component includes
identifying a precious set of components that includes the at least one needed component, and
determining whether the present component of the operating system is not included in the precious set of components.

20. The method of claim 19, further comprising:
displaying the unneeded present component in a user interface.

21. A method stored as a set of instructions that are executable by a processor, comprising:
providing a component data file containing descriptions of a number of available operating system components;
parsing the descriptions of the number of available operating system components to generate a component data structure;
identifying a number of present components in an operating system;
identifying at least one of a number of imported symbols and a number of exported symbols present in a number of object modules by reading the number of object modules, wherein the number of object modules are compiled source code;
storing symbol names and attributes of the number of imported symbols and number of exported symbols in a module data structure, wherein the attributes include whether the symbol is imported or exported;
determining a number of required components, including the steps of:
identifying a number of needed components based on the symbol names and attributes and the descriptions of the number of operating system components, and
identifying those of the number of needed components that are not included in the number of present components; and
displaying the number of required components in a graphical user interface.

22. A system including lines of software code that are configured to be executed by a processor, comprising:
component descriptions of a number of operating system components;
an object module examination utility configured to receive a number of object modules and output symbol names and attributes for a number of imported symbols in the number of object modules, wherein the number of object modules are compiled source code;
a project analysis utility configured to receive the symbol names and attributes and component descriptions and identify a number of needed components based on the symbol names and attributes and the component descriptions and identify a number of required components based on whether any of the number of needed components are identified as present in an operating system;
a user interface coupled to the project analysis utility to display to a user the required component which is not identified as present in the operating system, wherein an input is received from the user via the user interface indicating the required component is to be loaded into the operating system; and
a loading component to load the required component into the operating system after receiving the input.

23. The system of claim 22, wherein the user interface is a graphical user interface and includes a display having a box that is configured to display the representations of the number of required components.

24. The system of claim 22, further comprising:
a dependency management tool configured to identify whether any of the number of required components requires any of the needed components which are identified as present in the operating system and output a number of dependency components.

25. The system of claim 22, further comprising:
a module parser coupled to the object module examination utility to receive the symbol names and attributes and populate a module data structure with the symbol names and attributes;
wherein the project analysis utility is configured to receive the symbol names and attributes from the module data structure.

26. The system of claim 25, wherein the module data structure is a module cross reference database.

27. The system of claim 22, further comprising:
a component parser configured to receive the component descriptions and populate a component data structure with the component descriptions;
wherein the project analysis utility is configured to receive the component descriptions from the component data structure.

28. The system of claim 27, wherein the component data structure is a component cross reference database.

29. The system of claim 27, wherein the component data structure includes an dependency indication of at least one of the number of needed components that is required by another of the number of needed components.

30. The system of claim 29, wherein the dependency indication includes an "include when" command.

31. The system of claim 22, further comprising:
a compiler configured to receive a number of source code modules and output a number of object modules based on the number of source code modules.

32. The system of claim 22, wherein the component descriptions are stored in a number of component description files.

33. A system including lines of software code that are configured to be executed by a processor, comprising:
a number of operating system components;
a compiler configured to receive a number of source code modules and output a number of object modules based on the number of source code modules;
an object module examination utility configured to receive the number of object modules and output symbol names and attributes for at least one of a number of imported symbols and a number of exported symbols in the number of object modules, wherein the number of object modules are compiled source code;
a module parser coupled to the object module examination utility to receive the symbol names and attributes and populate a module data structure with the symbol names and attributes;
a component parser configured to receive descriptions of the number of operating system components;
a component data structure coupled to the component parser to receive the descriptions of the number of operating system components;
a project analysis utility coupled to the component data structure and module data structure; and
a graphical user interface coupled to the project analysis utility;
wherein the project analysis utility is configured to determine a number of needed components based on the module data structure and component data structure, and wherein the graphical user interface is configured to display representations of the number of needed components that have been determined to export at least one of the number of imported symbols.

* * * * *